United States Patent
Lee et al.

(10) Patent No.: US 6,709,486 B2
(45) Date of Patent: Mar. 23, 2004

(54) PRESSURE SWING ADSORPTION PROCESS WITH CONTROLLED INTERNAL DEPRESSURIZATION FLOW

(75) Inventors: Sang Kook Lee, Allentown, PA (US); Justin David Bukowski, Lenhartsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1 day.

(21) Appl. No.: 10/119,165

(22) Filed: Apr. 8, 2002

(65) Prior Publication Data

US 2003/0188634 A1 Oct. 9, 2003

(51) Int. Cl.$^7$ ............................................. B01D 53/047
(52) U.S. Cl. ................................ 95/96; 95/98; 95/100; 95/103; 95/138
(58) Field of Search ............................ 95/96, 98, 100, 95/103, 105, 138

(56) References Cited

U.S. PATENT DOCUMENTS

| | | | | | |
|---|---|---|---|---|---|
| 3,430,418 A | * | 3/1969 | Wagner | ........................ | 95/100 |
| 3,564,816 A | * | 2/1971 | Batta | ........................ | 95/100 |
| 3,636,679 A | * | 1/1972 | Batta | ........................ | 95/100 |
| 4,077,780 A | * | 3/1978 | Doshi | ........................ | 95/100 |
| 4,256,469 A | * | 3/1981 | Leitgeb | ........................ | 95/96 |
| 4,264,339 A | * | 4/1981 | Juntgen et al. | ................ | 95/96 |
| 4,348,213 A | * | 9/1982 | Armond | ........................ | 95/103 |
| 4,576,614 A | * | 3/1986 | Armond et al. | ................ | 95/23 |
| 4,640,694 A | * | 2/1987 | Leitgeb et al. | ................ | 95/100 |
| 4,722,742 A | * | 2/1988 | Leitgeb | ........................ | 95/100 |
| 5,122,164 A | * | 6/1992 | Hirooka et al. | ................ | 95/26 |
| 5,234,472 A | * | 8/1993 | Krishnamurthy et al. | ....... | 95/98 |
| 5,258,056 A | * | 11/1993 | Shirley et al. | ................ | 95/22 |
| 5,294,247 A | * | 3/1994 | Scharpf et al. | ............... | 95/101 |
| 5,328,503 A | * | 7/1994 | Kumar et al. | ................ | 95/101 |
| 5,330,561 A | * | 7/1994 | Kumar et al. | ................ | 95/101 |
| 5,346,536 A | | 9/1994 | Kaneshige et al. | ........... | 95/103 |
| 5,429,666 A | * | 7/1995 | Agrawal et al. | ............... | 95/101 |
| 5,441,558 A | | 8/1995 | Lee et al. | ........................ | 95/100 |
| 5,490,871 A | * | 2/1996 | Coates et al. | ................... | 95/23 |
| 5,518,526 A | * | 5/1996 | Baksh et al. | ................... | 95/100 |
| 5,520,720 A | | 5/1996 | Lemcoff | ......................... | 95/96 |
| 5,529,607 A | * | 6/1996 | Tan | ................................ | 95/12 |
| 5,565,018 A | * | 10/1996 | Baksh et al. | ................... | 95/100 |
| 5,656,068 A | * | 8/1997 | Smolarek et al. | .............. | 95/101 |
| 5,733,359 A | * | 3/1998 | Doong et al. | ..................... | 95/8 |
| 5,735,938 A | * | 4/1998 | Baksh et al. | ................... | 95/101 |
| 5,738,709 A | | 4/1998 | Lee et al. | ........................ | 95/98 |
| 5,755,856 A | * | 5/1998 | Miyake et al. | ................. | 95/101 |
| 5,846,294 A | * | 12/1998 | Doong | ............................ | 95/98 |
| 5,863,315 A | * | 1/1999 | Jullian et al. | ................... | 95/98 |
| 6,007,606 A | * | 12/1999 | Baksh et al. | .................... | 95/98 |
| 6,045,603 A | * | 4/2000 | Chen et al. | ..................... | 95/101 |
| 6,048,384 A | * | 4/2000 | Smolarek | ........................ | 95/98 |
| 6,083,299 A | * | 7/2000 | Kapoor et al. | ................. | 95/100 |
| 6,102,985 A | * | 8/2000 | Naheiri et al. | .................. | 95/101 |
| 6,113,672 A | * | 9/2000 | Kapoor et al. | ................. | 95/101 |
| 6,210,466 B1 | * | 4/2001 | Whysall et al. | ................ | 95/100 |
| 6,277,174 B1 | * | 8/2001 | Neu et al. | ........................ | 95/12 |
| 6,428,607 B1 | * | 8/2002 | Xu et al. | ......................... | 95/101 |

\* cited by examiner

*Primary Examiner*—Robert H. Spitzer
(74) *Attorney, Agent, or Firm*—John M. Fernbacher

(57) ABSTRACT

A pressure swing adsorption process for recovering a less readily adsorbable component from a feed gas mixture comprising at least one less readily adsorbable component and at least one more readily adsorbable component. The process utilizes a plurality of adsorbent beds, each bed having a feed end and product end, wherein the process includes the gas transfer steps of (1) transferring gas from the product end of the bed to the product end of another bed; followed by (2) withdrawing waste depressurization gas from the feed end of the bed while continuing to transfer gas from the product end of the bed to the product end of another bed;

(3) during either or both of (1) and (2), transferring gas from the feed end of the bed to the feed end or ends of the one or more other beds; and (4) prior to (1), transferring gas from the product end of the bed at a higher pressure to the product end of another bed at a lower pressure.

12 Claims, 3 Drawing Sheets

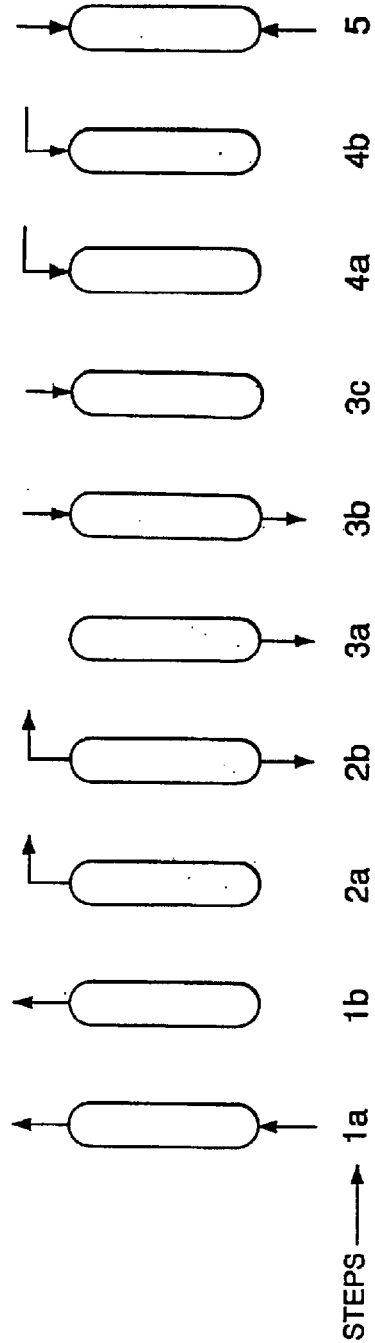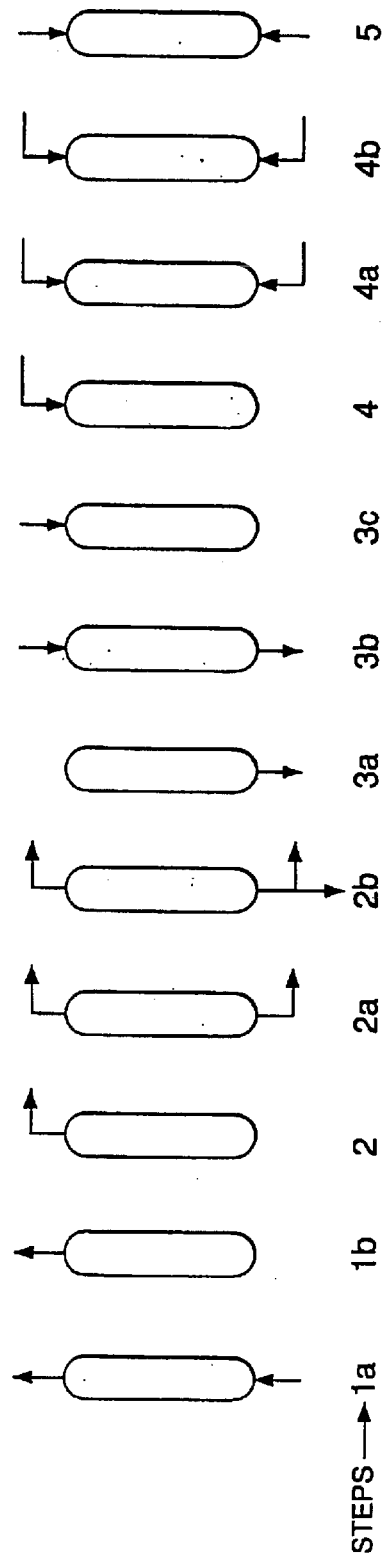

US 6,709,486 B2

PRESSURE SWING ADSORPTION PROCESS WITH CONTROLLED INTERNAL DEPRESSURIZATION FLOW

BACKGROUND OF THE INVENTION

Pressure swing adsorption is an important gas separation process which is widely used in the process and manufacturing industries. Pressure swing adsorption (PSA) is used for recovering high-purity gas products from crude process gas streams, for example in hydrogen production, or as an alternative to hauled-in atmospheric gas products or onsite cryogenic air separation processes. The PSA process has been highly developed for the separation of a wide variety of gas mixtures including, for example, the separation of air to provide oxygen and nitrogen products. For smaller product volumes in air separation applications, PSA processes may use a single adsorbent bed and one or more gas storage tanks to provide a constant product flow as well as gas for repressurization and purge. At higher product volumes, multiple adsorbent beds operating in parallel with overlapping cycles are used to generate a constant product gas flow as well as provide gas for repressurization and purge.

Each adsorbent bed in a pressure swing adsorption (PSA) cycle proceeds through a sequence of steps beginning with a feed or adsorption step in which a pressurized feed gas mixture is passed through a bed of adsorbent which selectively adsorbs one or more of the components in the mixed feed gas. A product gas containing the desired component at acceptable purity is withdrawn from the bed until the adsorption step is terminated at a predetermined time.

After termination of the adsorption step, the pressure in the bed is reduced in one or more steps in which gas is transferred at decreasing pressure to one or more other beds to provide pressurization gas to those beds. Final depressurization typically is completed by withdrawing a waste gas in a final waste depressurization or blowdown step. The depressurized bed then is purged with product gas or transfer gas provided from other beds, thereby removing additional adsorbed components and void space gas from the bed.

Upon completion of the purge step, the bed is repressurized to an intermediate pressure by one or more pressurization steps in which gas is transferred from other beds, and the bed then is pressurized further to the feed pressure with feed and/or product gas. The steps are repeated in a cyclic manner.

The transfer of gas from a bed at decreasing pressure to another bed at increasing pressure is an important and highly-developed feature of many PSA cycles. In this bed-to-bed gas transfer process, gas which is below product quality, but which still contains a significant concentration of the final product component, is transferred from the product end of a bed to the product end of another bed. This important step significantly increases product recovery, but must be carefully controlled to meet the required product purity. Optionally, gas of lower quality can be transferred from the feed end of the bed to the feed end of another bed.

Further refinement in the bed-to-bed gas transfer process holds promise for needed improvements in product recovery and product purity, and also for increased productivity, in the PSA process. In particular, there is a need for improved control of gas flow within a bed undergoing gas withdrawal during the gas transfer process. This need is addressed by the present invention as described below and defined by the claims which follow.

BRIEF SUMMARY OF THE INVENTION

An embodiment of the invention includes a pressure swing adsorption process for recovering a less readily adsorbable component from a feed gas mixture comprising at least one less readily adsorbable component and at least one more readily adsorbable component, which process comprises performing cyclic process steps in a plurality of adsorbent beds, each bed having a feed end and a product end and containing adsorbent material which selectively adsorbs the more readily adsorbable component, each bed proceeding in turn through cyclic process segments which include an adsorption-make product segment, a first gas transfer segment in which gas flows from a bed initially at a higher pressure into one or more other beds initially at a lower pressure or lower pressures, a regeneration segment, a second gas transfer segment in which gas flows into a bed initially at a lower pressure from one or more other beds initially at a higher pressure or higher pressures, and a final repressurization segment. The gas transfer segments include (1) transferring gas from the product end of the bed to the product end of another bed; followed by (2) withdrawing waste depressurization gas from the feed end of the bed while continuing to transfer gas from the product end of the bed to the product end of another bed;

(3) during either or both of (1) and (2), transferring gas from the feed end of the bed to the feed end or ends of the one or more other beds; and (4) prior to (1), transferring gas from the product end of the bed at a higher pressure to the product end of another bed at a lower pressure.

The ratio of the volume of gas transferred from the product end of the bed during (1) to the volume of gas transferred from the product end of the bed during (2) may be between about 3 and about 20.

During (2), the ratio of the volume of waste depressurization gas withdrawn from the feed end of the bed to the volume of gas transferred from the product end of the bed may be between about 0.1 and about 0.6.

Another embodiment of the invention relates to a pressure swing adsorption process for recovering a less readily adsorbable component from a feed gas mixture comprising at least one less readily adsorbable component and at least one more readily adsorbable component, which process comprises performing cyclic process steps in a plurality of adsorbent beds, each bed having a feed end and a product end and containing adsorbent material which selectively adsorbs the more readily adsorbable component, each bed proceeding in turn through cyclic process segments which include an adsorption-make product segment, a first gas transfer segment in which gas flows from a bed initially at a higher pressure into one or more other beds initially at a lower pressure or lower pressures, a regeneration segment, a second gas transfer segment in which gas flows into a bed initially at a lower pressure from one or more other beds initially at a higher pressure or higher pressures, and a final repressurization segment. The gas transfer segments include (1) transferring gas from the product end of the bed to the product end of another bed; followed by (2) withdrawing waste depressurization gas from the feed end of the bed while continuing to transfer gas from the product end of the bed to the product end of another bed;

(3) during either or both of (1) and (2), transferring gas from a point intermediate the feed end and the product end of the bed to the feed end or ends of the one or more other beds; and (4) prior to (1), an additional step of transferring gas from the product end of the bed at a higher pressure to the product end of another bed at a lower pressure.

The ratio of the volume of gas transferred from the product end of the bed during (1) to the volume of gas transferred from the product end of the bed during (2) may be between about 3 and about 20.

During (2), the ratio of the volume of waste depressurization gas withdrawn from the feed end of the bed to the volume of gas transferred from the product end of the bed may be between about 0.1 and about 0.6.

The invention also relates to a pressure swing adsorption process for recovering a less readily adsorbable component from a pressurized feed gas comprising at least one less readily adsorbable component and at least one more readily adsorbable component, which process comprises performing cyclic process steps in two parallel adsorbers, each adsorber having a feed end and a product end and containing adsorbent material which selectively adsorbs the more readily adsorbable component. The cyclic process steps include:

(a) providing a pressurized feed gas at superatmospheric pressure and introducing the pressurized feed gas into the feed end of a first adsorber, selectively adsorbing a portion of the more readily adsorbable component on the adsorptive material, and withdrawing from the product end of the first adsorber a product gas enriched in the less readily adsorbable component;

(b) depressurizing the first adsorber by (1) transferring gas from an outlet at the product end of the first adsorber into the product end of the second adsorber and (2) withdrawing gas through an additional outlet disposed at a distance from the product end of the first adsorber and transferring this gas into the feed end of the second adsorber;

(c) continuing to transfer gas from the outlet at the product end of the first adsorber into the product end of the second adsorber and from the additional outlet of the first adsorber into the feed end of the second adsorber while simultaneously withdrawing waste depressurization gas from the feed end of the first adsorber;

(d) terminating all transfer of gas from the first adsorber to the second adsorber while continuing to withdraw waste depressurization gas from the feed end of the first adsorber;

(e) introducing product gas into the product end of the first adsorber while continuing to withdraw waste depressurization gas from the feed end of the first adsorber;

(f) pressurizing the first adsorber by (1) transferring gas from an outlet at the product end of the second adsorber to the product end of the first adsorber and (2) withdrawing gas through an additional outlet disposed at a distance from the product end of the second adsorber and transferring this gas into the feed end of the first adsorber, wherein the second adsorber is initially at a higher pressure than the first adsorber;

(g) further pressurizing the first adsorber by transferring gas from the product end of the second adsorber to the product end of the first adsorber and from the additional outlet of the second adsorber to the feed end of the first adsorber, and withdrawing waste depressurization gas from the feed end of the second adsorber;

(h) terminating all transfer of gas from the second adsorber to the first adsorber and further pressurizing the first adsorber by one or more steps selected from the group consisting of introducing product gas into the product end thereof, introducing pressurized feed gas mixture into the feed end thereof, and introducing product gas into the product end thereof while also introducing pressurized feed gas into the feed end thereof; and (i) repeating steps (a) through (h) in a cyclic manner.

The additional outlet of the first adsorber in steps (b) and (c) may be at the feed end of the first adsorber and the additional outlet of the second adsorber in steps (f) and (g) may be at the feed end of the second adsorber. Alternatively, the additional outlet of the first adsorber in steps (b) and (c) may be intermediate the feed and product ends of the first adsorber and the additional outlet of the second adsorber in steps (f) and (g) may be intermediate the feed and product ends of the second adsorber.

The process may further comprise, following step (a) and prior to step (b), transferring gas from the product end of the first adsorber into the product end of the second adsorber, wherein the second adsorber is at a lower pressure than the first adsorber; and following step (e) and prior to step (f), further pressurizing the first adsorber by transferring gas from the product end of the second adsorber to the product end of the first adsorber, wherein the second adsorber is at a higher pressure than the first adsorber.

The process may further comprise, following step (e) and prior to step (f), terminating the withdrawal of waste depressurization gas from the feed end of the first adsorber and continuing to introduce product gas into the product end of the first adsorber. Alternatively, the process may further comprise, following step (a), terminating the introducing of the pressurized feed gas into the feed end of the first adsorber while continuing withdrawing from the product end of the first adsorber a product gas enriched in the less readily adsorbable component.

BRIEF DESCRIPTION OF SEVERAL VIEWS OF THE DRAWINGS

FIG. 2 is a bed step diagram illustrating the process steps for an adsorbent bed according to one embodiment of the present invention.

FIG. 3 is a bed step diagram illustrating the process steps for an adsorbent bed according to a second embodiment of the present invention.

DETAILED DESCRIPTION OF THE INVENTION

Figure 1:
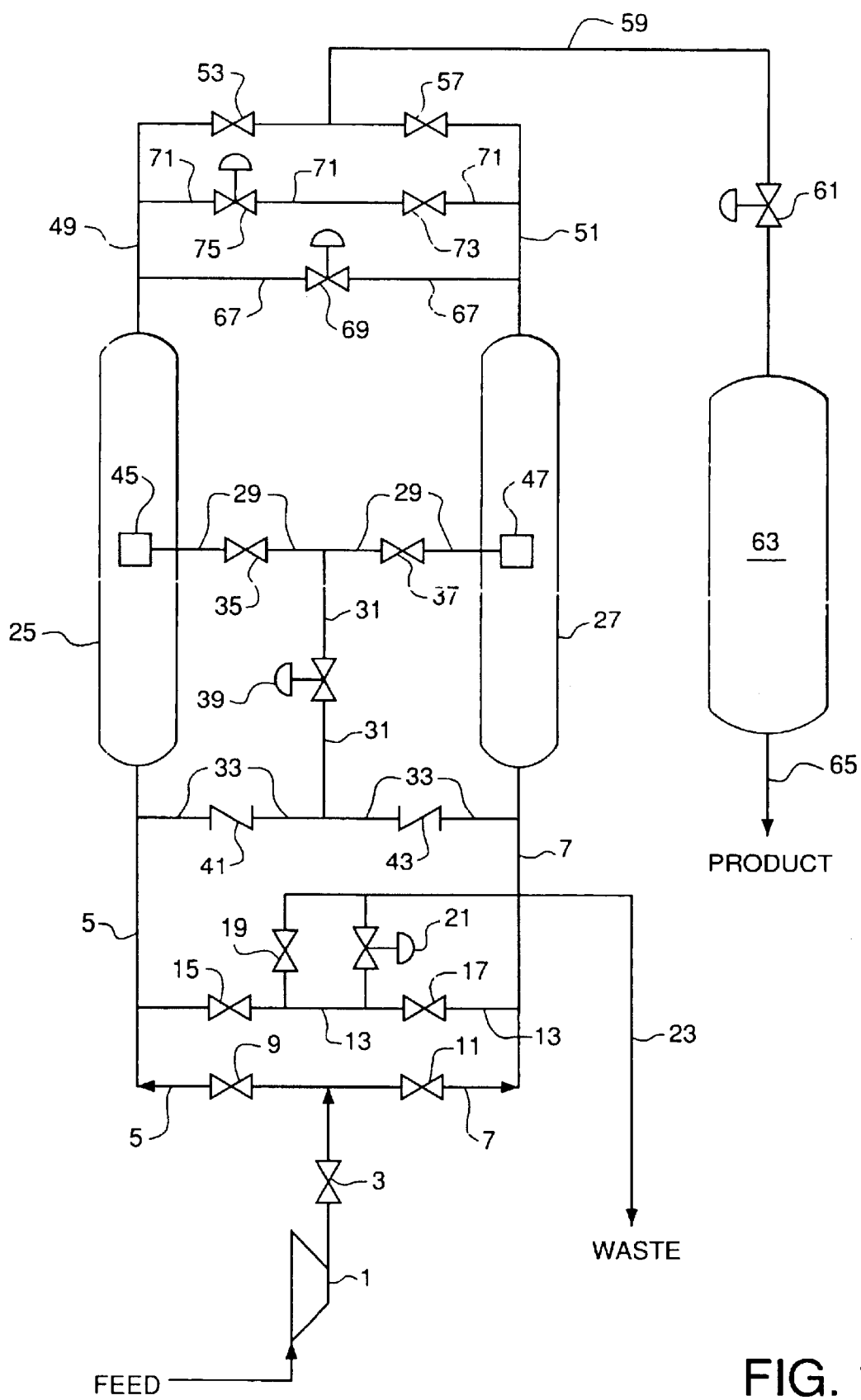
FIG. 1 is a schematic flow diagram of a PSA system which can be used with the process cycles of the present invention.

The present invention relates to improved pressure swing adsorption process cycles with particular emphasis on improved aspects of the gas transfer steps in which gas is transferred from a bed at a higher pressure to another bed at a lower pressure. In the following discussion, the PSA cycle is defined as a series of process segments, each of which may include one or more individual process steps. Each PSA cycle of the present invention is divided into five process segments, each of which comprises one or more individual process steps, some of which are optional. The process segments as defined below for each individual adsorbent bed are (1) an adsorption/make product segment, (2) a first gas transfer segment, (3) a bed regeneration segment, (4) a second gas transfer segment, and (5) a bed repressurization segment.

The adsorption/make product segment is defined as the withdrawal of product gas from an adsorbent bed during which feed gas is introduced into the bed for at least a portion of the segment. The more readily adsorbed component or components are selectively adsorbed by the adsorbent material during this segment. The first gas transfer segment is defined as one or more steps in which gas is transferred from the bed at a higher pressure to one or more other beds at a lower pressure or lower pressures. The regeneration segment is defined as the desorption and removal of adsorbed components and void space gas from the bed, one step of which is defined as waste depressurization in which void space and desorbed gas are discharged from the feed end of the bed as the pressure in the bed decreases. The resulting waste depressurization gas is discharged directly from the PSA process, typically as a waste stream. The second gas transfer segment is defined as one or more steps in which gas is transferred to the bed at a lower pressure from one or more other beds at a higher pressure or higher pressures. The bed repressurization segment is defined as pressurizing the first bed by one or more steps selected from the group consisting of introducing product gas into the product end thereof, introducing pressurized feed gas mixture into the feed end thereof, and introducing product gas into the product end thereof while also introducing pressurized feed gas into the feed end thereof.

The generic term "gas transfer segment" is defined to include both the first and second gas transfer segments defined above, and therefore includes by definition the transfer of gas between any bed and one or more other beds.

In all embodiments of the invention as described below, the gas transfer segment partially overlaps the regeneration segment such that (1) gas is transferred from a bed at a higher pressure to another bed at a lower pressure and then (2) a waste depressurization gas is withdrawn from the feed end of the bed and simultaneously gas is transferred from the bed at a higher pressure to another bed at a lower pressure. When air is the feed gas being separated, waste depressurization may be driven by the differential pressure between the bed pressure and atmospheric pressure, and the waste depressurization gas may be discharged directly to the atmosphere. Alternatively, the waste depressurization gas may be discharged into a vessel or reservoir which is initially at a lower pressure than the bed pressure and the discharged gas may be utilized as a secondary gas product enriched in the more readily adsorbed component.

The invention can be utilized in process cycles with multiple parallel adsorbent beds and is particularly adapted for use with two parallel beds. In one embodiment which uses two parallel beds, gas is transferred from the product end of the first bed to the product end of the second bed during an initial portion of the first gas transfer segment. Then, during a later step in the first gas transfer segment, while gas transfer continues from the product end of the first bed to the product end of the second bed, waste depressurization gas is withdrawn from the feed end of the first bed. Waste depressurization gas flows from the feed end of a bed as a result of a pressure differential between the bed and a lower pressure region.

In a second embodiment, additional gas is transferred from the feed end of the first bed to the feed end of the second bed during both steps of the first gas transfer segment. In a third embodiment, additional gas is transferred from a point intermediate the feed and product ends of the first bed to the feed end of the second bed during both steps of the gas transfer segment. In an alternative version of either the second or third embodiment, an additional gas transfer step may be used at the beginning of the gas transfer segment such that the first gas transfer segment includes three gas transfer steps. This additional gas transfer step entails transferring gas from the product end of the first bed into the product end of the second bed. This alternative version of the invention thus comprises a gas transfer segment which includes a first step wherein gas is transferred from the product end of the first bed to the product end of the second bed, a second step in which gas continues to be transferred between the product ends of the first and second beds while additional gas is transferred between the feed ends of the beds or between an intermediate point in the first bed to the feed end of the second bed, and a third step in which waste depressurization gas is withdrawn from the feed end of the first bed while gas transfer continues at the feed and product ends.

The features of the present invention can be applied in process cycles which utilize two or more adsorbent beds and can be used generically to separate any gas mixture which contains components which are more readily adsorbed and other components which are less readily adsorbed by the adsorbent material in the beds. The invention is particularly useful for the recovery of high purity nitrogen from air, and can be operated economically with two adsorbent beds.

FIG. 1 is a schematic flow diagram for a two-bed PSA system typical of those known in the art which can be utilized for operation of the PSA process of the present invention. The invention is illustrated below for the recovery of nitrogen from air and is not limited to operation using this particular system. Any appropriate type of PSA system known in the art may be utilized for the invention. The system of FIG. 1 includes air compressor 1, feed flow control valve 3 and manifolds 5 and 7 having feed valves 9 and 11 respectively. Manifold 13 is connected to manifolds 5 and 7 and includes valves 15 and 17. Valve 19 and control valve 21 connect manifold 13 with waste discharge line 23. Manifolds 5 and 7 are connected to the feed ends of adsorber beds 25 and 27, and these beds may be filled with carbon molecular sieve adsorbent which preferentially adsorbs oxygen over nitrogen. Other adsorbents known in the art may be used if desired.

In one embodiment of the invention later described, midpoint gas transfer manifolds 29, 31, and 33 are utilized in conjunction with valves 35 and 37, control valve 39, and check valves 41 and 43. Gas withdrawal assemblies 45 and 47 are adapted to withdraw gas from intermediate locations in the beds.

Product gas manifolds 49 and 51 are connected to the product ends of adsorber beds 25 and 27 and to valves 53 and 57 which connect the manifolds to product line 59. Flow control valve 61 connects product line 59 with product tank 63 and product line 65 transfers final product gas to a downstream user.

Purge line 67 with flow control valve 69 connects product manifolds 49 and 51. Gas transfer manifold 71 with valve 73 and control valve 75 also connect product manifolds 49 and 51.

A first embodiment of the invention is illustrated below for the recovery of nitrogen from air with reference to the schematic flow diagram of FIG. 1 and the bed step diagram of FIG. 2, which shows schematically the step sequence for a given bed through one process cycle. In this embodiment, midpoint gas transfer manifolds 29, 31, and 33, valves 35 and 37, control valve 39, check valves 41 and 43, and gas withdrawal assemblies 45 and 47 are not required and would not be present in the operating system. A cycle for this first embodiment is described below for each step of the cycle segments defined above. This is an exemplary cycle and the invention is not limited by any specific step or steps described below.

1. Adsorption/Make Product Segment

Step (1a): Feed air is compressed to a typical pressure of 110–130 psig in compressor 1, passes through flow control valve 3, control valve 9, and manifold 5 into adsorber bed 25. Oxygen is preferentially adsorbed therein and high purity nitrogen product which may contain 95 to 99.9995 vol % nitrogen flows via manifold 49, valve 53, line 59, control valve 61, and into product tank 63. Final product nitrogen is withdrawn via line 65 to the user. The duration of this step is typically 60 to 180 seconds and the end-of-step pressure may be in the range of 100 to 120 psig. In this step and the following steps, a control valve typically is used for on-off control of a gas stream while a flow control valve is set to control gas flow at a predetermined value. In some applications, an orifice plate may be used instead of a flow control valve.

Step (1b) (optional): In this optional make product step, feed flow to adsorber bed 25 is terminated by closing valve 9 while product gas continues to flow through product manifold 49. This optional step may continue for 0.5 to 2.0 seconds and is terminated by closing valve 53. A typical end-of-step pressure is 98 to 118 psig.

2. First Gas Transfer Segment

Step (2a): Valves 5, 17, 53, and 69 are closed, valves 73 and 75 are opened, and gas is transferred at a controlled rate from bed 25 through manifolds 49, 71, and 51 into bed 27. This step may continue for 1 to 10 seconds and may end when the differential pressure between beds 25 and 27 is in the range of 5 to 25 psi.

Step (2b): While the product-end-to-product-end gas transfer of step (2a) continues, valves 15 and 21 open, and waste depressurization gas flows at a controlled rate from the feed end of bed 25 through manifold 5, manifold 13, and waste discharge line 23. This step may continue for 0.5 to 3 seconds and typically ends when the differential pressure between beds 25 and 27 is in the range of 2 to 10 psi. The pressure in bed 25 at the end of step (2b) may be in the range of 40 to 60 psig. The ratio of the volume of gas transferred from the product end of bed 25 during step (2a) to the volume of gas transferred from the product end of bed 25 during step (2b) may be between about 3 and about 20. The ratio of the volume of waste depressurization gas withdrawn from the feed end of bed 25 during step (2b) to the volume of gas transferred from the product end of bed 25 during step (2b) may be between about 0.1 and about 0.6.

3. Regeneration Segment

Step (3a): Valves 73 and 75 close and valve 19 opens to increase the discharge rate of waste depressurization gas from bed 25. Step (3a) typically lasts for 4 to 5 seconds and may end when the pressure in bed 25 is in the range of 0 to 10 psig.

Step (3b): Valve 69 opens and product purge gas flows via manifolds 67 and 49 into the product end of bed 25 while waste gas continues to flow via manifold 5, manifold 13, valves 15 and 19, and waste discharge line 23. Alternatively, product gas for purge may be obtained from product tank 63 via line 59 and valve 53. Step (3b) typically lasts for 60 to 180 seconds and may be carried out at pressures approaching 0 psig.

Step (3c): Valves 15 and 19 close, and a low flow rate of product gas continues to flow through valve 69 and manifold 67 into the product end of bed 25. This pushes the front of desorbing oxygen back into the bed in preparation for the following repressurization steps. Alternatively, product gas for this purpose may be obtained from product tank 63 via line 59 and valve 53. Step (3c) typically lasts for 2 to 20 seconds and the end-of-step pressure in bed 25 may be in the range of 2 to 8 psig. This is an optional step.

4. Second Gas Transfer Segment

Step (4a): Valve 69 closes and valves 73 and 75 open to begin gas transfer to bed 25 from bed 27, which has just completed adsorption/make product step (1a) or optionally has just completed make product step (1b). Valves 7 and 57 are closed. This step may continue for 1 to 10 seconds and typically ends when the differential pressure between beds 25 and 27 is in the range of 5 to 25 psi.

Step (4b): While the product-end-to-product-end gas transfer of step (4a) continues, valves 17 and 21 open, and waste depressurization gas flows at a controlled rate from the feed end of bed 27 through manifold 7, manifold 13, and waste discharge line 23. This step may continue for 0.5 to 3 seconds and typically ends when the differential pressure between beds 25 and 27 is in the range of 2 to 10 psi. Typically the pressure in bed 25 at the end of step (4b) is in the range of 35 to 60 psig. The ratio of the volume of gas transferred from the product end of bed 27 during step (4a) to the volume of gas transferred from the product end of bed 27 during step (4b) is preferably between about 3 and about 20. The ratio of the volume of waste depressurization gas withdrawn from the feed end of bed 27 during step (4b) to the volume of gas transferred from the product end of bed 27 during step (4b) preferably is between about 0.1 and about 0.6.

5. Repressurization Segment

Repressurization of bed 25 commences while bed 27 proceeds into step (3a). Bed 25 can be repressurized by any desired combination of product gas via valve 53 and manifold 49 and/or feed gas via valves 3 and 9 and manifold 5. This step may continue for 3 to 5 seconds and may end when the pressure in bed 25 at the end of step (5) is in the range of 90 to 110 psig.

The process described above may be operated with several options and/or additional steps as described below.

Option A: Additional Feed-end-to-feed-end Gas Transfer

In this option, additional gas is transferred during steps (2a) and 2(b) from the feed end of bed 25 through manifolds 5 and 13, valves 15 and 17, and manifold 7 into the feed end of bed 27. Valves 19 and 21 are closed during step (2a). Also, additional gas is transferred during steps (4a) and (4b) from the feed end of bed 27 through manifolds 7 and 13, valves 15 and 17, and manifold 5 into the feed end of bed 25. This option is illustrated in the bed step diagram of FIG. 3.

Option B: Mid-bed-to-feed-end Gas Transfer

This option utilizes midpoint gas transfer manifolds 29, 31, and 33 in conjunction with valves 35 and 37, control valve 39, check valves 41 and 43, and gas withdrawal assemblies 45 and 47 as described earlier with reference to FIG. 1. In this option, additional gas is transferred during steps (2a) and 2(b) from gas withdrawal assembly 45, manifold 29, valve 35, manifold 31, control valve 39, manifold 33, and check valve 43 via manifold 7 into the feed end of bed 27. Additional gas is transferred during steps (4a) and (4b) from gas withdrawal assembly 47, manifold 29, valve 37, manifold 31, control valve 39, manifold 33, and check valve 41 via manifold 5 into the feed end of bed 25. This option is illustrated in the bed step diagram of FIG. 4.

Option C: Intermediate-point-to-intermediate-point Gas Transfer

In this option, additional gas is transferred during steps (2a) and 2(b) from gas withdrawal assembly 45, which may be located at any desired point between the feed and product ends of bed 25 (not shown). The gas is transferred via a modified manifold (not shown) to a gas introduction point between the feed and product ends of bed 27. The distance between gas withdrawal assembly 45 and the feed end of bed 25 is greater than the distance between the gas introduction point and the feed end of bed 27. Also, additional gas is transferred during steps (4a) and (4b) from gas withdrawal assembly 47, which may be located at any convenient point between the feed and product ends of bed 27 (not shown). The gas is transferred via a modified manifold (not shown) to a gas introduction point between the feed and product ends of bed 25. The distance between gas withdrawal assembly 47 and the feed end of bed 27 is greater than the distance between the gas introduction point and feed end of bed 25.

Option D: Additional product-end-to-product-end Gas Transfer

This option may be used in any of Options A, B, and C described above. Additional gas transfer steps between the product ends of beds 25 and 27 are added as shown in the bed step diagrams of FIGS. 3 and 4. An additional step (2) is added prior to step (2a) in which gas is transferred from the feed end of bed 25 to the feed end of bed 27 by the valves and manifolds described above. A corresponding step (4) is added prior to step (4a) in which gas is transferred from the feed end of bed 27 to the feed end of bed 25 by the valves and manifolds described above.

Option E: Alternative Steps for Regeneration Segment

Alternative steps may be used for the regeneration segment in any of the options described above. In one regeneration option, waste repressurization step (3a) is not used while steps (3b) and (3c) are used as described. In another regeneration option, purge step (3a) is used as described, purge step (3b) is not used, and product gas is not introduced into the product end of the bed during step (3c). These regeneration options are illustrated by the bed step diagrams of FIGS. 1–4.

The above description emphasizes the cycle of steps for bed 25 with some reference to certain steps occurring in bed 27. Bed 27 proceeds through the same cycle steps described above for bed 25, but the two cycles are 180° out of phase. The main requirement is that gas transfer steps (2a) and (2b) in bed 25 must coincide with gas transfer steps (4a) and (4b) respectively in bed 27. In addition, gas transfer steps (2a) and (2b) in bed 27 must coincide with gas transfer steps (4a) and (4b) respectively in bed 25.

EXAMPLE

Figure 4:
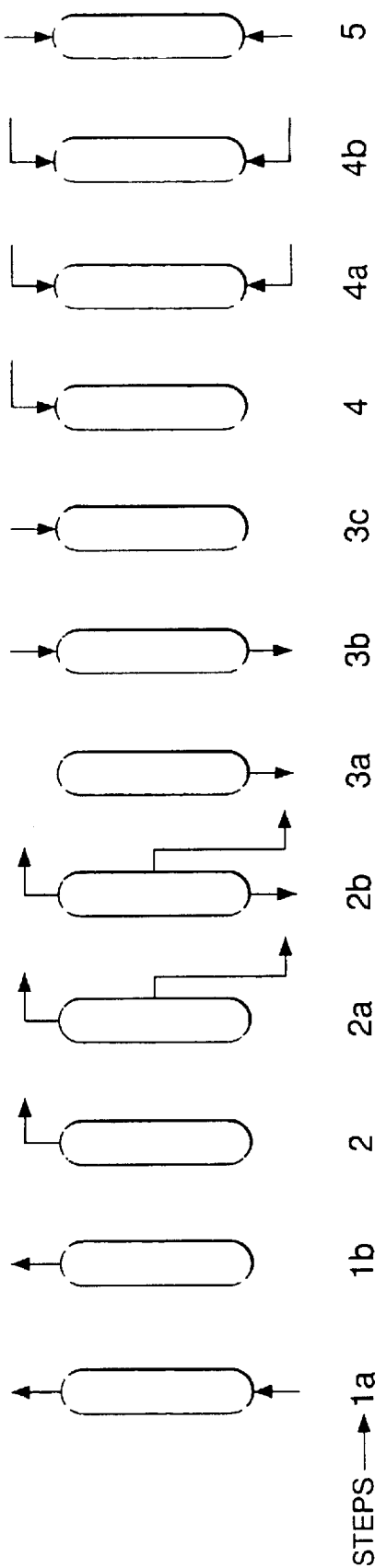
FIG. 4 is a bed step diagram illustrating the process steps for an adsorbent bed according to a third embodiment of the present invention.

A two-bed PSA process utilizing cycle segments 1 through 5 described above including Options B and D is operated according to the process flowsheet of FIG. 1 and the cycle step diagram of FIG. 4. Step (3a) is not used. The process separates feed air supplied at 700 SCFM and a pressure of 125 psig to yield 170 SCFM of high purity nitrogen product containing 99.99 vol % nitrogen. Adsorbent beds 25 and 27 are each 4.5 ft in diameter with a bed depth of 8 ft and contain carbon molecular sieves supplied by Takeda Chemical Industries, Ltd. The cycle times and end-of-step pressures are summarized for the process in Table 1 and the relationship of the cycle steps in the two beds are shown in Table 2. The total cycle time is 240 seconds.

TABLE 1

Cycle Times and Pressures for Each Bed
Example 1

| Cycle Segment | Step | Duration, seconds | End-of-step pressure, psig |
|---|---|---|---|
| Adsorption/Make | 1a | 107 | 112 |
| Product | 1b | 2 | 110 |
| First Gas | 2 | 1 | 105.5 |
| Transfer | 2a | 5.5 | 65 |
|  | 2b | 0.5 | 58.5 |
| Regeneration | 3b | 95 | 0 |
|  | 3c | 18 | 8 |
| Second Gas | 4 | 1 | 12.5 |
| Transfer | 4a | 5.5 | 53 |
|  | 4b | 0.5 | 56 |
| Repressurization | 5 | 4 | 100 |

TABLE 2

Cycle Steps and Times for Beds 25 and 27
Example 1

| Duration (sec) | 4 | 91 | 16 | 2 | 1 | 5.5 | 0.5 | 4 | 91 | 16 | 2 | 1 | 5.5 | 0.5 |
|---|---|---|---|---|---|---|---|---|---|---|---|---|---|---|
| End-of-Step Time (sec) | 4 | 95 | 111 | 113 | 114 | 119.5 | 120 | 124 | 215 | 231 | 233 | 234 | 239.5 | 240 |
| Cycle Step (bed 25) | 5 | 1a | 1b | 2 | 2a | 2b | 3b | | 3c | | 4 | 4a | 4b | |
| Cycle Step (bed 27) | 3b | | 3c | | 4 | 4a | 4b | 5 | 1a | | 1b | 2 | 2a | 2b |

The present invention thus offers a PSA cycle with improved control of gas flow within a bed undergoing gas withdrawal during the gas transfer process. Careful control and timing of gas transfer at the product ends of the beds and from an intermediate location and/or the feed ends of the beds yields several benefits. At the end of the adsorption/make product segment, the void spaces within the bed contain gas at high pressure which ranges in purity from product quality at the product end of the bed to lower quality at the feed end of the bed. In the first gas transfer segment, the pressure energy within this void gas is partially recovered and transferred to another bed. As described above, the transferred gas may be withdrawn from the product end, the feed end, or from a point intermediate either end.

Gas transferred from the product end of the high pressure bed is of higher purity than gas from the middle or the feed end of the bed, and is therefore preferred for transfer to the product end of another bed which is at lower pressure. There is a possible deleterious effect of gas transfer from the product end which may limit the benefit of this gas transfer. As gas transfer proceeds, the gas within the bed will flow towards the product end of the bed, and the unwanted component of the feedstock may be drawn far enough towards the product end to reduce the effectiveness of the subsequent regeneration step in cleaning the bed. In addition, transfer of the unwanted component may result in contamination of the receiving bed.

These deleterious effects may be reduced by conducting a portion of the gas transfer from a secondary outlet closer to the feed end of the high pressure bed, such as the middle of the bed, or from the feed end itself. The gas transfer from this secondary outlet causes internal gas flow away from the product end of the bed, which reduces the migration of the unwanted component towards that end of the bed. However, in order to provide a sufficient amount of internal flow towards the feed end of the bed and compensate for the internal flow due to gas transfer from the product end of the bed, the amount of gas transferred from the secondary outlet should be carefully controlled to prevent the excessive transfer of low purity gas to the receiving bed.

The invention provides a means to optimize the internal gas flow in the higher pressure bed during gas transfer to the lower pressure bed. By utilizing carefully controlled waste depressurization from the feed end of the bed during a latter portion of the gas transfer segment, additional internal gas flow is created towards the feed end to oppose the flow due to the gas transfer from the product end, and this minimizes the potential deleterious effects of the pressure transfer from the product end of the bed while maximizing the amount of gas which can be transferred. In addition, by initiating the waste depressurization step during the latter part of the first gas transfer segment, the regeneration segment is effectively lengthened, and the regeneration of the bed can be made more complete.

What is claimed is:

1. A pressure swing adsorption process for recovering a less readily adsorbable component from a feed gas mixture comprising at least one less readily adsorbable component and at least one more readily adsorbable component, which process comprises performing cyclic process steps in a plurality of adsorbent beds, each bed having a feed end and a product end and containing adsorbent material which selectively adsorbs the more readily adsorbable component, each bed proceeding in turn through cyclic process segments which include an adsorption-make product segment, a first gas transfer segment in which gas flows from a bed initially at a higher pressure into one or more other beds initially at a lower pressure or lower pressures, a regeneration segment, a second gas transfer segment in which gas flows into a bed initially at a lower pressure from one or more other beds initially at a higher pressure or higher pressures, and a final repressurization segment, wherein the gas transfer segments include (1) transferring gas from the product end of the bed to the product end of another bed; followed by
   (2) withdrawing waste depressurization gas from the feed end of the bed while continuing to transfer gas from the product end of the bed to the product end of another bed;
   (3) during either or both of (1) and (2), transferring gas from the feed end of the bed to the feed end or ends of the one or more other beds; and
   (4) prior to (1), transferring gas from the product end of the bed at a higher pressure to the product end of another bed at a lower pressure.

2. The process of claim 1 wherein the ratio of the volume of gas transferred from the product end of the bed during (1) to the volume of gas transferred from the product end of the bed during (2) is between about 3 and about 20.

3. The process of claim 1 wherein during (2) the ratio of the volume of waste depressurization gas withdrawn from the feed end of the bed to the volume of gas transferred from the product end of the bed is between about 0.1 and about 0.6.

4. A pressure swing adsorption process for recovering a less readily adsorbable component from a feed gas mixture comprising at least one less readily adsorbable component and at least one more readily adsorbable component, which process comprises performing cyclic process steps in a plurality of adsorbent beds, each bed having a feed end and a product end and containing adsorbent material which selectively adsorbs the more readily adsorbable component, each bed proceeding in turn through cyclic process segments which include an adsorption-make product segment, a first gas transfer segment in which gas flows from a bed initially at a higher pressure into one or more other beds initially at a lower pressure or lower pressures, a regeneration segment, a second gas transfer segment in which gas flows into a bed initially at a lower pressure from one or more other beds initially at a higher pressure or higher pressures, and a final repressurization segment, wherein the gas transfer segments include (1) transferring gas from the product end of the bed to the product end of another bed; followed by
   (2) withdrawing waste depressurization gas from the feed end of the bed while continuing to transfer gas from the product end of the bed to the product end of another bed;
   (3) during either or both of (1) and (2), transferring gas from a point intermediate the feed end and the product end of the bed to the feed end or ends of the one or more other beds; and
   (4) prior to (1), an additional step of transferring gas from the product end of the bed at a higher pressure to the product end of another bed at a lower pressure.

5. The process of claim 4 wherein the ratio of the volume of gas transferred from the product end of the bed during (1) to the volume of gas transferred from the product end of the bed during (2) is between about 3 and about 20.

6. The process of claim 4 wherein during (2) the ratio of the volume of waste depressurization gas withdrawn from the feed end of the bed to the volume of gas transferred from the product end of the bed is between about 0.1 and about 0.6.

7. A pressure swing adsorption process for recovering a less readily adsorbable component from a pressurized feed gas comprising at least one less readily adsorbable component and at least one more readily adsorbable component, which process comprises performing cyclic process steps in two parallel adsorbers, each adsorber having a feed end and a product end and containing adsorbent material which selectively adsorbs the more readily adsorbable component, which cyclic process steps include:

(a) providing a pressurized feed gas at superatmospheric pressure and introducing the pressurized feed gas into the feed end of a first adsorber, selectively adsorbing a portion of the more readily adsorbable component on the adsorptive material, and withdrawing from the product end of the first adsorber a product gas enriched in the less readily adsorbable component;
   (b) depressurizing the first adsorber by (1) transferring gas from an outlet at the product end of the first adsorber into the product end of the second adsorber and (2) withdrawing gas through an additional outlet disposed at a distance from the product end of the first adsorber and transferring this gas into the feed end of the second adsorber;

(c) continuing to transfer gas from the outlet at the product end of the first adsorber into the product end of the second adsorber and from the additional outlet of the first adsorber into the feed end of the second adsorber while simultaneously withdrawing waste depressurization gas from the feed end of the first adsorber;

(d) terminating all transfer of gas from the first adsorber to the second adsorber while continuing to withdraw waste depressurization gas from the feed end of the first adsorber;

(e) introducing product gas into the product end of the first adsorber while continuing to withdraw waste depressurization gas from the feed end of the first adsorber;

(f) pressurizing the first adsorber by (1) transferring gas from an outlet at the product end of the second adsorber to the product end of the first adsorber and (2) withdrawing gas through an additional outlet disposed at a distance from the product end of the second adsorber and transferring this gas into the feed end of the first adsorber, wherein the second adsorber is initially at a higher pressure than the first adsorber;

(g) further pressurizing the first adsorber by transferring gas from the product end of the second adsorber to the product end of the first adsorber and from the additional outlet of the second adsorber to the feed end of the first adsorber, and withdrawing waste depressurization gas from the feed end of the second adsorber;

(h) terminating all transfer of gas from the second adsorber to the first adsorber and further pressurizing the first adsorber by one or more steps selected from the group consisting of introducing product gas into the product end thereof, introducing pressurized feed gas mixture into the feed end thereof, and introducing product gas into the product end thereof while also introducing pressurized feed gas into the feed end thereof; and (i) repeating steps (a) through (h) in a cyclic manner.

8. The process of claim 7 wherein the additional outlet of the first adsorber in steps (b) and (c) is at the feed end of the first adsorber and the additional outlet of the second adsorber in steps (f) and (g) is at the feed end of the second adsorber.

9. The process of claim 7 wherein the additional outlet of the first adsorber in steps (b) and (c) is intermediate the feed and product ends of the first adsorber and the additional outlet of the second adsorber in steps (f) and (g) is intermediate the feed and product ends of the second adsorber.

10. The process of claim 7 which further comprises:

following step (a) and prior to step (b), transferring gas from the product end of the first adsorber into the product end of the second adsorber, wherein the second adsorber is at a lower pressure than the first adsorber; and following step (e) and prior to step (f), further pressurizing the first adsorber by transferring gas from the product end of the second adsorber to the product end of the first adsorber, wherein the second adsorber is at a higher pressure than the first adsorber.

11. The process of claim 7 which further comprises, following step (e) and prior to step (f), terminating the withdrawal of waste depressurization gas from the feed end of the first adsorber and continuing to introduce product gas into the product end of the first adsorber.

12. The process of claim 7 which further comprises, following step (a), terminating the introducing of the pressurized feed gas into the feed end of the first adsorber while continuing withdrawing from the product end of the first adsorber a product gas enriched in the less readily adsorbable component.

* * * * *